UNITED STATES PATENT OFFICE.

ERIC A. STARKE, OF SAN FRANCISCO, CALIFORNIA, ASSIGNOR TO THE UNITED STATES SMOKELESS POWDER COMPANY, OF SAME PLACE.

PROCESS OF MAKING AMMONIUM BICHROMATE.

SPECIFICATION forming part of Letters Patent No. 527,563, dated October 16, 1894.

Application filed March 2, 1894. Serial No. 502,138. (No specimens.)

*To all whom it may concern:*

Be it known that I, ERIC A. STARKE, a citizen of the United States, residing in the city and county of San Francisco, State of California, have invented an Improvement in the Preparation of Ammonium Chromates; and I hereby declare the following to be a full, clear, and exact description of the same.

My invention relates to an improved process for the preparation of ammonium chromates and their union with other substances.

It consists in forming a solution of ammonium picrate and potassium bi-chromate, so that a transposition of the elements takes place and new compounds are formed within the solution. It is especially useful in the preparation of chromate or bi-chromate of ammonia, and in the formation of explosive compounds in which these substances are used.

In carrying out my invention I take ammonium picrate and make a solution, and add to this solution a solution of potassium bi-chromate. When these solutions are thus united a transposition takes place which forms potassium picrate and ammonium bi-chromate, and if an excess of ammonium picrate is used there will also remain this excess of ammonium picrate.

If I desire to simply produce the bi-chromate of ammonia I only employ a sufficient proportion of the solution of ammonium picrate to provide the necessary amount for the transposition which takes place in the solution without leaving any excess. The transposition which takes place is expressed in the following equation:

The potassium picrate thus formed will separate in fine crystals as it is quite insoluble in cold water, and the ammonium bi-chromate will remain in solution. The crystals of potassium picrate will thus be precipitated to the bottom and may be separated leaving the ammonium bi-chromate. This process reduces considerably the cost of producing the ammonium chromates, and is a very efficient and convenient method for so doing.

When it is desired to manufacture an explosive compound, I employ the solution of ammonium picrate making such an excess over what is necessary to produce the potassium picrate, and ammonium bi-chromate as to provide for the proper proportion of ammonium picrate which remains in the solution with the ammonium bi-chromate. The mixture is then evaporated until dry, the exact proportion of the salts necessary for the explosive compound having first been arrived at by mixing the proper proportion of the original ingredients, and if there be an excess of potassium picrate, this may be removed, previous to evaporation.

In a former patent for preparing an explosive compound with these ingredients, I have described the ingredients as being prepared separately by finely pulverizing and then thoroughly incorporating them as in the manufacture of black powder. This necessitates considerable labor and the higher cost of ammonium chromate which is avoided by my present process.

Having thus described my invention, what I claim as new, and desire to secure by Letters Patent, is—

1. The process of preparing ammonium bi-chromate consisting in mixing a solution of ammonium picrate and a solution of potassium bi-chromate together, and afterward separating the ammonium bi-chromate solution from the precipitated crystals of potassium picrate, and evaporating the ammonium bi-chromate solution to dryness.

2. The method of preparing an explosive compound, consisting in mixing a solution of potassium bi-chromate and ammonium picrate in proper proportions, then evaporating the resultant mixture of ammonium picrate, ammonium bi-chromate and potassium picrate, substantially as herein described.

In witness whereof I have hereunto set my hand.

ERIC A. STARKE.

Witnesses:
S. H. NOURSE,
J. A. BAYLESS.